United States Patent [19]

Hasselman, Jr. et al.

[11] 4,103,876

[45] Aug. 1, 1978

[54] METHOD AND APPARATUS FOR CONTINUOUSLY PRODUCING AND APPLYING FOAM

[76] Inventors: Walter J. Hasselman, Jr.; Walter J. Hasselman, Sr., both of 1084 Post Rd., Scarsdale, N.Y. 10583

[21] Appl. No.: 573,120

[22] Filed: Apr. 30, 1975

[51] Int. Cl.² .............................................. B01F 5/04
[52] U.S. Cl. .................................. 366/178; 239/400; 239/432; 261/DIG. 26
[58] Field of Search ............... 259/4 R; 239/493, 432, 239/400, 404; 261/DIG. 26; 222/145

[56] References Cited

U.S. PATENT DOCUMENTS

| 998,762 | 7/1911 | Faller | 261/DIG. 26 |
| 1,649,062 | 11/1927 | Halliburton | 261/DIG. 26 |
| 2,715,045 | 8/1955 | Thompson | 239/432 |
| 2,860,856 | 11/1958 | Bauer | 259/4 R |
| 2,941,900 | 6/1960 | Schroder-Stranz | 117/72 |
| 3,342,271 | 9/1967 | Anthony | 239/432 |
| 3,434,805 | 3/1969 | Bar | 23/285 |
| 3,486,862 | 12/1969 | Unterstenhoefer | 259/4 R |

FOREIGN PATENT DOCUMENTS

| 1,171,059 | 1/1959 | France | 259/4 AB |
| 1,021,648 | 3/1966 | United Kingdom | 259/4 R |
| 1,190,588 | 5/1970 | United Kingdom | 259/4 R |
| 20,199 of | 1892 | United Kingdom | 239/493 |

*Primary Examiner*—Richard E. Aegerter
*Assistant Examiner*—John W. Shepperd

*Attorney, Agent, or Firm*—Pennie & Edmonds

[57] ABSTRACT

A method and apparatus particularly adapted for use in the continuous production of a foam material or the like. The apparatus essentially embodies a first material delivery and mixing means for delivering an atomized spray of a first material in one direction of flow, and for delivering a second generally annular stream of a second material about the first material such that both the first and second materials flow in substantially parallel directions wherein the first stream mixes in the core of the layer of second material, and for enabling the intimate and homogeneous mixing of the first and second materials; and a second material delivery and mixing means operatively connected downstream to said first material delivery and mixing means for forming the homogeneous admixture of the first and second materials into a generally annular stream which flows in substantially the same parallel direction as the first and second materials, and for introducing an atomized third material into approximately the center of the annular layered admixed stream such that the third material flows in substantially parallel directions to the annular stream of admixed first and second materials, and for enabling the homogeneous admixture of the first, second and third materials, such that the resultant admixture is discharged from said second material delivery and mixing means in a direction which is substantially parallel to the direction of flow of the first, second and third materials.

23 Claims, 7 Drawing Figures

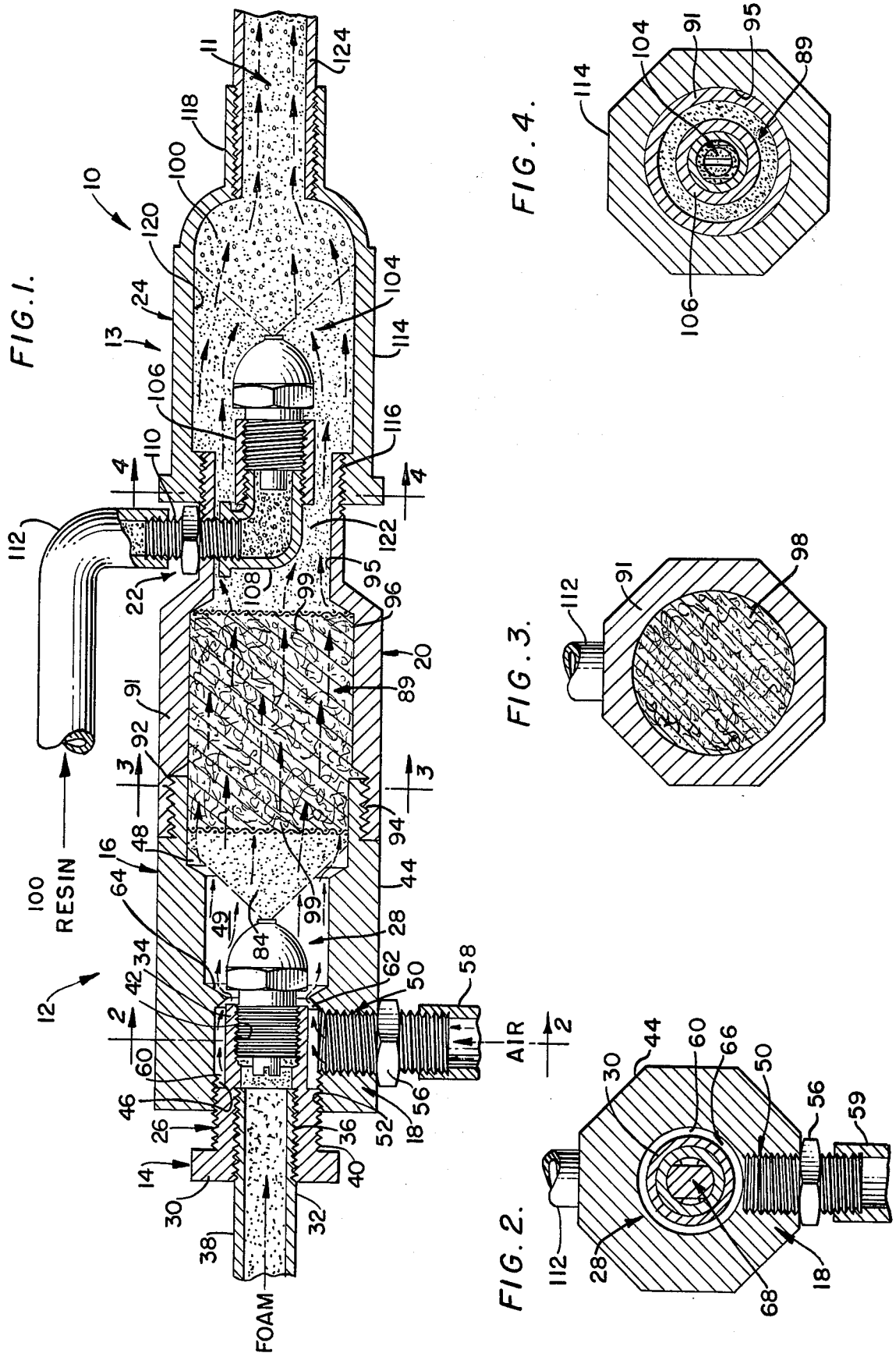

METHOD AND APPARATUS FOR CONTINUOUSLY PRODUCING AND APPLYING FOAM

BACKGROUND OF THE INVENTION

1. Field of the Invention

The present invention is directed to apparatus and method for continuously producing foam material or the like. More particularly, it pertains to a novel and improved method and apparatus especially adapted for use in continuously forming a foam material or the like from a variety of curable synthetic resins and foaming agents expanded by air.

2. Description of the Prior Art

Heretofore, it has been rather common practice in the field of producing plastic foam or the like to employ a foam-gun for the purposes of intermixing the constituents of the foam material and, thereafter, applying the resultant admixture to a particular body surface. Various types of known foam-gun constructions have in general been proposed, and to some extent generally accomplish the basic functions of intermixing and applying such admixture which contains the constituents typically forming the foam material. One such type of prior construction is described in U.S. Pat. No. 3,434,805. As disclosed in the above referenced patent, a curable synthetic resin is introduced into an annular layer of foam-forming material which has already been expanded by air. Such an arrangement, however, while performing the noted basic operations is subject to several shortcomings which detrimentally affect a complete and satisfactory operation thereof under normal working conditions. For instance, with such aforenoted type of construction, there is a relatively high likelihood of clogging developing. Moreover, with this kind of construction, somewhat of a greater difficulty might also be experienced in gaining access to the nozzle should it be desired to clean and change the same. In addition, to achieve a mixture of components such gun construction relies on a relatively thin cone-shaped layered stream of resinous material. A thin layered stream, however, does not achieve as great a homogeneous admixture of constituent materials as could be desired and, therefore, is not entirely successful.

Other conventional types of prior art foam-gun constructions, such as described in U.S. Pat. Nos. 2,860,856 and 2,941,900, serve to introduce the resinous and other appropriate materials at angles relative to an axial line extending through the foam-gun. It has been found that whenever a material, such as, for example, resin, is introduced at an angle to the path of other materials flowing through the foam-gun which travel in a general axial direction in the gun, there is a likelihood of a slight restriction occurring at the discharge end of the gun and the materials have a tendency to back up. This restriction results by reason of the fact that the resinous material will not only act to impede or slow the normal flow rate of the material already traveling in the foam-gun but also has more or less of a tendency to solidify whenever it comes into contact with the other materials. As a consequence thereof, and as noted earlier, the materials tend to solidify and clog up the major portion of the gun. Normally the clogging occurs at the barrel where the pressure is. Hence, such kinds of foam-guns have a relatively great tendency to not satisfactorily perform their intended operations. Accordingly, such clogging necessitates an increased amount of maintenance and repair which, in turn, results in loss of production time and an increase in maintenance costs. Moreover, the foregoing category of foam-gun is relatively more difficult to clean by virtue of its construction.

As previously indicated, heretofore known types of foam-guns utilize a rather standard type nozzle for purposes of providing an atomized spray. Ordinarily, in this particular field, there are different types of nozzles which produce different spray effects. One such standard type has a head portion with a plurality of relatively narrow slots which run in a generally zig-zag fashion. These slots converge toward the forwardmost section of the head portion and serve to enable the formation of an atomized spray. Such spray normally takes the configuration of a hollow cone wherein the particulate forming the spray is somewhat heavily concentrated in a rather thin outer layer. Accordingly, the center of this cone is virtually void of spray particulate. A shortcoming associated with this form of hollow cone spray is, of course, that it does not present a solid atomizing effect, that is to say, the particles thereof are not generally uniformly distributed throughout the cone. Consequently, of course, any resulting mixture of such particles with other materials is not as intimately and homogeneously admixed. As a result, heretofore known nozzle insert constructions fail to provide an arrangement which will enable the formation of a solid atomizing spray effect, much less one which can perform such, in a manner which is simple and relatively inexpensive to achieve.

Another disadvantage normally associated with known kinds of foam-guns is the relatively complicated and expensive maintenance which occurs whenever conventional froth inducing devices in foam-guns are cleaned. One form of conventional froth inducing device consists of a plurality of small bead-like members having about a 2 mil diameter and numbering approximately 500 in a typical foam-gun chamber. To satisfactorily clean such bead-like members requires the expenditure of considerable effort in order to remove chemicals which have accumulated on the surface thereof, as well as, in certain circumstances, separating beads which have become joined together. As is believed evident from the foregoing, the maintenance of such froth inducing devices is somewhat time consuming and expensive.

As can be readily appreciated from the foregoing general description of known kinds of foam-guns and nozzles therefor, such are subject to several operational disadvantages in the field.

SUMMARY OF THE INVENTION

Accordingly, therefore, it is an object of the present invention to overcome the aforementioned shortcomings associated with the conventional type of foam-guns or the like by providing a novel and improved method and apparatus which in a continuous manner enable production and application of a foam material from a curable synthetic resin and a foaming agent expanded by air.

As hereinafter briefly set forth, the unique and unobvious foam-gun apparatus contemplated for use in the present invention is basically comprised of a first material delivery means, first assembly, second material delivery means, second assembly, third material delivery means, and a third assembly.

The first assembly may include a first opening at one end thereof which has detachably connected thereto the first material delivery means. Such first material delivery means may include a nozzle assembly means which will serve to deliver a solid finely atomized spray of foam-forming particles centrally within the first opening. It is envisioned that the improved nozzle assembly means produce a solid atomizing effect for purposes of enhancing a more intimate and homogeneous mixture of materials. The second material delivery means may include a second opening formed in the first assembly means and in direct communication with the first opening for enabling air to be introduced into the first opening. The second opening is arranged with respect to the first opening so that whenever air enters the first opening from the second opening, it forms a generally outer annular layer of air about the nozzle assembly means. By virtue of this particular arrangement, whenever the foam-forming solution is discharged from the nozzle means it enters the center or core of the annular layer of air in a solid atomizing manner so as to provide for a more intimate and homogeneous admixture of air and foam-forming material. In addition, the first assembly is detachably connected to the second assembly to define a first mixing chamber located somewhat downstream of the nozzle means. Such chamber is constructed so as to slow the speed of the flowing constituents. Accordingly, since the speed of the two materials is relatively slowed, there is allowed more time for mixing. As a result, the chamber improves and increases the intermixing reaction occurring therein. Moreover, the foregoing arrangement enables the foam-forming material and air to travel in generally parallel directions which functions to diminish the tendency for clogging to occur within the foam-gun. In a preferred embodiment, a frothing mesh is located within the first chamber and may be used for inducing a frothing action of the material as well as serving to regulate the cell size of the materials. In addition, use of frothing mesh significantly reduces maintenance in maintaining a proper frothing device in a foam-gun.

The third assembly means is mechanically operatively connected to the second assembly means and defines a second mixing chamber. The third material delivery means may include a third opening formed in the second assembly and downstream of the first chamber. Such third opening is in direct communication with the admixed stream of air and foam-forming materials. Additionally, the third material delivery means includes a second nozzle means which is supported substantially within the center of the flowing admixed stream. This second nozzle means functions in a substantially similar manner to the first nozzle means for delivering a solid atomized spray of a third or resinous material. The resinous material is directed in a substantially parallel direction to the direction of flow for the admixed stream. Since the second nozzle means is centered within the aforenoted stream of admixed materials, such admixed materials will form a generally annular layer about the second nozzle means. Accordingly, the second nozzle means functions to likewise inject a solid atomized spray of resinous material within the core of the annular admixed stream. As a consequence thereof, the resinous material is more uniformly and homogeneously mixed with the foam-forming material expanded by air. Additionally, the tendency of the materials, especially the resinous material, to clog during introduction and subsequent flow through the foam-gun is substantially reduced because, as indicated, all the components are traveling in a generally parallel direction through the gun. The second mixing chamber is also so constructed as to enable the three materials introduced into the foam-gun apparatus to be intimately and homogeneously mixed. Such second chamber is constructed in a manner that serves to impede or slow the speed of the flowing streams. Consequently, the materials are able to be more uniformly and homogeneously mixed prior to discharge from the gun nozzle. The third assembly further includes an outlet opening in direct communication with the second mixing chamber. Such outlet opening is constructed in a manner which will increase the speed of the mixed stream as it exits from the second chamber. Thereafter, of course, the thoroughly mixed materials are appropriately foamed and discharged for suitable application upon an appropriate surface therefor.

Basically, the first and second nozzle means may include a generally hollow nozzle member which enables the passage therethrough of a liquid medium. Centrally supported in and connected to the nozzle member is the improved nozzle means of the present invention. This nozzle means essentially includes a standard type of nozzle insert member which has been modified in accordance with the principles of the instant invention. Such modifications comprise shortening the insert member by several thousands of an inch and enlarging the normal narrow slots so that they have substantially enlarged and V-shaped configurations. The result of these changes enable the production of a solid atomized spray which significantly enhances subsequent mixing of the material handled by the nozzle.

As noted, the novel and improved process of the present invention is particularly or especially useful for the continuous production of a foam-like material. According to one preferred embodiment contemplated it essentially comprises the steps of; introducing a generally annular or cylindrical laminar stream of a first material into a first chamber, introducing a solid atomized stream of a second material, flowing in a generally parallel direction to the first stream, into the interior of the first annular stream for homgeneously mixing both the first and second materials in the first chamber, forming the admixed stream of first and second materials into a second generally annular layered stream which flows in a direction generally parallel to the direction of the admixed first and second streams, introducing the admixed cylindrical stream into a second chamber, and introducing a solid atomized stream of a third material into the generally annular layered admixed stream flowing in such a fashion that it is generally parallel to the homogeneously mixed stream comprised of the first and second materials.

BRIEF DESCRIPTION OF THE DRAWINGS

The above, as well as other objects, features, and advantages of the present invention shall become readily apparent upon a detailed reading of a preferred embodiment of the present invention when viewed in conjunction with the accompanying drawings wherein like reference numerals indicate like structure throughout the several views.

FIG. 1 is a sectional side elevational view illustrating in detail the components forming the improved foam-gun apparatus of the present invention;

FIG. 2 is a sectional view taken substantially along section line 2—2 appearing in FIG. 1 looking in the direction of the arrows and illustrating an arrangement of certain components forming the foam-gun apparatus;

FIG. 3 is a sectional view taken substantially along the section line 3—3 appearing in FIG. 1 looking in the direction of the arrows and illustrating the frothing mesh in the preferred embodiment;

FIG. 4 is a cross-sectional view taken substantially along the section line 4—4 appearing in FIG. 1 looking in the direction of the arrows and illustrating in detail another arrangement of components of the present invention;

DETAILED DESCRIPTION

Figure 5:
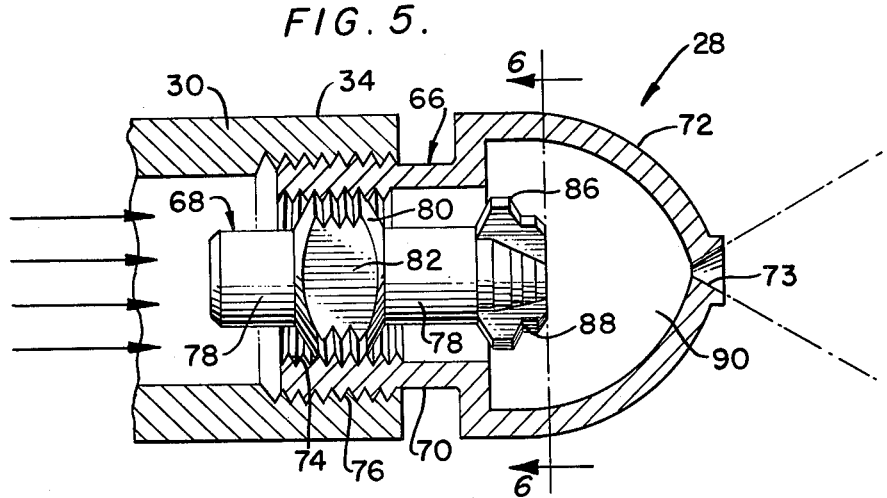
FIG. 5 is an enlarged sectional side elevational view of a preferred embodiment of the improved nozzle embodying the principles of the present invention.

Referring in particular to FIGS. 1 to 4, there is perhaps best depicted a preferred embodiment of a foam-gun apparatus embodying the principles of the present invention and generally designated by reference numeral 10. The succeeding description of the foam-gun 10 will be directed to its utilization in the continuous production of a foam-like material 11 which is discharged upon any suitable surface therefor (not shown). In particular, the subsequent description of the foam-gun apparatus 10 is directed to the continuous production of a foam material or the like which may be made from any suitable type or variety of curable synthetic resin, such as for example, urea formaldehyde, phenol urea formaldehyde, urea melamine formaldehyde, urea furfural formaldehyde and a suitable acid foaming agent which has been expanded by air and which is of the type normally used with such of the above kinds of synthetic resins. It will be understood, however, that the present invention contemplates that other forms of materials may be suitably utilized in association with the foam-gun apparatus 10 of the present invention without departing from the spirit and scope thereof.

As contemplated, the illustrated embodiment of the present invention includes first and second material delivery and mixing means 12 and 13, respectively. The first material delivery and mixing means 12 basically comprises first material delivery means 14, first assembly means 16, second material delivery means 18, and second assembly means 20. The second material delivery and mixing means 13 essentially includes a third material delivery means 22, and third assembly means 24.

Specifically referring to FIG. 1 taken in conjunction with FIG. 2, there is perhaps best illustrated the first material delivering means 14. Such material delivery means 14 basically comprises a nozzle assembly means 26 and a novel and improved nozzle means 28, the details of which will be subsequently described in a succeeding description of the present invention. As clearly shown in FIG. 1, the nozzle assembly means 26 is basically comprised of a generally elongated tubular body 30 having inlet and outlet ends 32 and 34, respectively. An internally threaded bore 36 may be threadedly or otherwise suitably connected to a threaded end of supply line 38. The supply line 38 is adapted to deliver an acid foaming agent material from a suitable foaming agent supply source (not shown). Nozzle assembly means 26 is also provided with a threaded exterior surface 40 which is adapted to be detachably threadedly connected to the first assembly means 16 in a manner to be described presently. The outlet end 34 is threaded, such as shown at 42, for enabling the nozzle means 28 to be removably affixed thereto. Such detachable connection permits the quick removal of the nozzle means 28 should occasion warrant such removal, as, for example, whenever it is desired to clean or change the nozzle.

With respect to the first assembly means 16, it is seen to be essentially comprised of a generally elongated barrel breach member 44 having a first or inlet opening means 46, outlet opening means 48, and open cavity 49. The second material delivery means 18 may be defined by a second opening means 50 formed adjacent and in open communication with the first opening means 46. The first or inlet opening 46 of the first assembly means 16 is provided with an internal threaded section 52. This particular internal threaded section 52 cooperates with the external threaded surface 40 provided on the nozzle assembly means 26 for appropriately enabling the detachable connection of the nozzle assembly means 26 to first assembly means 16. This form of connection also prevents the pressurized materials from rearwardly escaping the rearward portion of the foam-gun apparatus 10. At the output end of barrel breach member 44 is formed a threaded shoulder 54 of reduced diameter.

With continued reference to FIG. 1, taken in conjunction with FIG. 2, the second material delivering means 18 of the preferred embodiment basically includes the second opening means 50 formed in the barrel breach member 44. Additionally, it includes a conventional fluid connector device 56 which is suitably fastened to a supply line 58. Such connector device 56 enables pressurized fluid, such as air, to be supplied from air supply line 58 to the first opening 46. Since, as noted, tubular body 30 of nozzle assembly means 26 closes the first opening 46 the material can only travel rightwardly, as viewed in the drawings. A radial clearance 60 is defined between the wall of first opening 46 and tubular body 30. Such radial clearance 60 is sufficient in dimension to allow the formation of a generally annular layered stream of air 62. The annular air stream 62 will advance through the inlet opening 46, through a restricted opening 64, and enter cavity 49. Cavity 49 has an enlarged diameter with respect to first opening 46. Air stream 62 will continue to advance past the outlet opening 48. Such outlet opening 48 has a diameter which may exceed that of cavity 49. By this particular arrangement, the flow rate of the air stream will, in accordance with well-known principles of dynamic fluid behavior, be somewhat reduced for purposes afterwards made clear. The particular significance of this relationship will be described in the succeeding description of the preferred embodiment.

Again referring to the nozzle means 28, reference is made to FIG. 1 taken in combination with FIGS. 2 and 5 to 7. As therein depicted, such nozzle means 28 is shown as essentially including a hollow nozzle housing member 66 having mechanically connected therewith a modified and improved nozzle insert member generally indicated by reference numeral 68. As more clearly indicated in FIG. 5 the nozzle housing member 66 has a generally elongated hollow configuration with a stem portion 70 and, preferably, a generally longitudinally extending hemispherical head member 72 at one end thereof. A nozzle orifice 73 is formed in head member 72 for enabling the discharge therefrom of a generally cone-shaped spray. By having the head portion 72 hemispherical in shape, it will be understood that whatever liquid material flows therethrough will be generally forced downwardly in front of the forward segment of head portion 86. This action serves to facilitate the cooperation between the fluid and slots 88. Stem portion 70 has appropriately formed thereon internal and external threaded segments 74 and 76, respectively. The external threads 76 are suitably threadedly received within the threaded outlet end 34 of tubular body 30. Also as can be observed from FIG. 1, head member 72, whenever attached to tubular body 30 is situated within cavity 49 for purposes subsequently made evident. The nozzle housing and insert members 66 and 68, respectively, may, of course, be suitably changed so as to enable the nozzle means 28 to meet various output requirements for the foam-gun apparatus 10.

Figure 6:
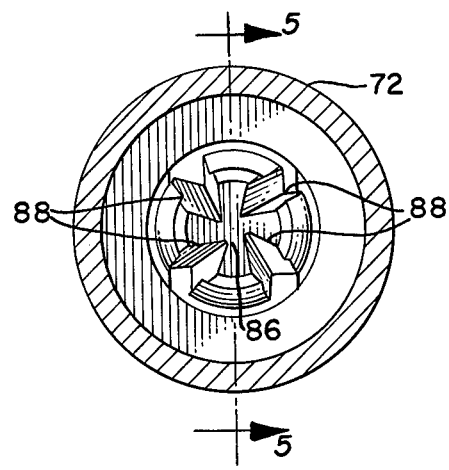
FIG. 6 is a sectional view taken substantially along section line 6—6 appearing in FIG. 5 looking in the direction of the arrows and illustrating other details of the improved nozzle of the present invention.
Figure 7:
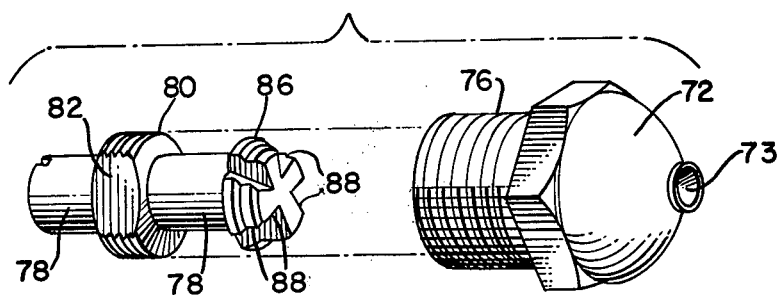
FIG. 7 is an exploded perspective view illustrating the components which form the improved nozzle of the present invention.

With continued reference to FIGS. 5 to 7, the nozzle insert member 68 is essentially a standard type of nozzle insert member but has been modified, in a manner to be discussed which is in accordance with the present invention so as to provide for improved spraying by providing a solid atomizing effect. Such nozzle insert member 68 is basically comprised of a standard narrow type single piece industrial oil burner nozzle which may be of the type generally commercially available from MONARCH Mfg. of Philadelphia, Pa. Essentially, it includes a generally elongated main body portion 78 which has intermediately formed thereon an enlarged exteriorly threaded segment 80. Such segment 80 is provided with opposed generally flat surface sides 82. The purpose served by these flats 82 is to enable the suitable type of fluid material such as foam agent 84 to pass through the nozzle housing member 66 and out through head orifice 73 into cavity 49. As noted, nozzle insert member 68 basically serves to provide a solid atomization effect on the fluid material operatively cooperating therewith. Commonly, as previously indicated, such standard types of nozzle insert head portions are provided with generally narrow slots which essentially function to atomize the fluid, to thereby produce a hollow cone effect. The principles of the present invention, however, contemplate that slots 88 have, preferably, enlarged and inclined substantially V-shaped configurations. Generally, such slots 88 are adapted to converge toward the forward point of the head portion 86 and at a conventional angle thereto. The angle enables a swirling or rifling effect to be produced on the material as it passes the head portion. Another modification which is performed on this standard type of oil burner nozzle is that the head portion is reduced in length, such as by any appropriate cutting technique available in the industry. By shortening the overall length of the head portion 86 by a predetermined amount the solid atomizing effect is able to be achieved. Through experimentation it has been determined that to produce a satisfactory solid atomized effect, the head portion 86 should be shortened by a distance which may optimally range from about 0.009 to 0.015 thousands of an inch. Of course, the spirit and scope of the present invention envision that the shortening of the head member and enlargement of the slots might be correspondingly changed to provide for the solid atomized spray should the basic dimensions of the standard oil burner nozzle be changed.

Specifically referring to FIG. 6, it will be seen that head portion 86 of nozzle insert member 68 is provided with four of such slots 88. Although the embodiment being illustrated discloses four slots 88, it is well within the spirit and scope of the present invention that other numbers of similarly shaped and enlarged slots 88 may be successfully utilized.

It is at once appreciated from the foregoing description that the fluid passes flats 82, slots 88 into hollow chamber 90 formed in hemispherical nozzle head 72, and eventually discharges in a solid atomized spray through the nozzle orifice 73. The nozzle means described is envisioned to be used in association with any type of suitable fluid for the nozzle.

Particularly referring back to FIG. 1, as therein depicted the nozzle head 72 is situated within cavity 49 for enabling the solid atomized spray to travel in a direction which is substantially parallel to the longitudinal axis of the foam-gun 10. As the annular stream of air 62 enters into cavity 49, the head 72 of nozzle means 28 is, as noted, centrally situated so that it emits foam-forming material 84 into the core or center of the annular stream of air. By this particular arrangement, the mixing of the air and foam-forming material is accomplished such that both are intimately, uniformly and homogeneously mixed. Accordingly, the resulting admixture stream 89 will serve to improve the quality of the ultimate foam material produced by the gun apparatus 10.

Both the atomized foam-forming material 84 and stream of air 62, will, by virtue of the above noted organization of structural components travel through foam-gun 10 in substantially parallel directions. The particular significance of having the air and foam-forming materials travel in a substantially parallel direction, is that it tends to eliminate clogging of these various types of material typically used in foam-gun 10.

Again referring to FIG. 1, the second assembly means 20 includes a generally elongated and hollow barrel muzzle housing member 91 which has an inlet end portion 92 thereof that defines an internally threaded inlet opening 94. This particular threaded inlet opening 94 threadedly cooperates in a conventional fashion, with the reduced threaded shoulder 54 of the barrel breach housing member 44 for detachably interconnecting the first and second assembly means. By this particular arrangement, the gun 10 may be more easily assembled and disassembled for providing access to the nozzle means 28 or the like. The barrel muzzle housing member 91 further includes an outlet opening 95 which, in a manner to be more fully described, cooperates with the third delivery means 22. The inlet opening 94 may be of a similar dimension as the outlet opening 48 of first assembly means 16. Whenever the barrel breach housing member 44 and barrel muzzle housing member 91 are in an assembled condition, they define a first mixing chamber which defines a generally designated by reference numeral 96. The diameter of this mixing chamber 96 is larger than the cavity 49. As a consequence thereof, the flow rate of the air stream 62 and foam-forming material stream 89 is relatively slowed in accordance with the well-known fluid dynamic principles. The beneficial result derived by this reduction in the flow rate is that it correspondingly results in a greater mixing time. As a consequence thereof, an even more homogeneous mixture of the air 62 and foam-forming material 84 will result.

The second assembly means 20 is further provided with a frothing mesh 98. Frothing mesh 98 is suitably received within chamber 96 in a conventional fashion at opening 94. Basically, the frothing mesh 98 serves the purposes of inducing frothing and aiding in regulating the cell size of the resultant admixture of air 62 and foam-forming material 84 so as to further enhance its reaction with the third or resinous material 100 downstream in a manner to be presently described.

The frothing means or mesh 98 is ordinarily located such that one-half is approximately in the barrel breach housing member 44, while the other half is situated within the barrel muzzle housing member 91, whenever both housing members are fastened together. The present invention envisions that the frothing mesh 98 may, preferably, be fabricated from stainless steel, although other suitable materials, such as plastic or copper, may likewise be employed for the mesh. For purposes of illustration and not limitation, it will be understood that should the first chamber 96 of the preferred embodiment have, for example, a 1 ⅜ inch diameter, then the length of the frothing mesh 98 could be, preferably, 3 inches with satisfactory foaming results being obtainable. Whatever the dimensions of the chamber 96, however, frothing mesh 98 should substantially fill the chamber 96 for producing a satisfactory frothing action.

It has also been determined that by adjusting the volume or bulk of the frothing mesh 98, the foam cell size which results correspondingly varies. Although foam has been produced with as low as 1 gram and as high as 25 grams of frothing mesh 98, the preferred range of weight therefor, which has produced satisfactory results, has been discovered to be from about between 2 to 10 grams; with 4 grams being considered ideal for a gun having a chamber with about 1⅜ inch diameter. Even if the frothing mesh 98 does not completely fill the chamber, an acceptable foam product would nevertheless be produced. What would occur, however, would be that the cellular size of the finished product would be somewhat larger. On the other hand, should an excess of frothing mesh 98 be inserted within the chamber 96, an acceptable finished product would still be produced, but, however, the cellular size would be somewhat smaller. As can be readily appreciated, the successful inducing of frothing can be affected by either too little or too much frothing mesh. An insufficient amount of frothing mesh 98 present within the chamber 96, of course, will be incapable of producing foam, whereas, if such frothing mesh is highly compacted into the chamber, the flow of air and catalyst will be substantially impeded, to the extent that foaming will not occur, since air channels through mesh 98 will be significantly obstructed. The frothing mesh 98 may be retained in proper position through the normal usage thereof by screens 99 situated at opposite ends of mesh 98. The screens 99 of the present invention permit the satisfactory retention of the frothing mesh 98 in proper position, and permit passage of materials therethrough while serving to control cellular size. While the preferred embodiment of gun 10 has been described with a frothing mesh, the present invention need not include frothing mesh in situations wherein foaming is not required. Although other types of devices such as a plurality of discrete spheres, may be employed to induce frothing within the gun, these other devices are not considered to be as effective and relatively maintenance free as frothing mesh 98. Whenever, circumstances dictate that the frothing mesh should be cleaned, an operator merely has to unfasten the housing members and simply replace the clogged mesh with new frothing mesh. This particular operation is economical and less time consuming whenever compared to heretofore known inducing means.

It is envisioned by the principles of the present invention that other techniques well-known in the field may be used to securely mount the mesh 98 within the barrel muzzle housing 91, such as by retaining rings or the like. Also, for improved results, the frothing mesh 98 can be made of any suitable material. One such material which has performed satisfactorily in conjunction with the chemicals used in the foam-gun 10 is stainless steel.

After the mixture of air 62 and foam-forming material 84 passes through the frothing mesh 98, it enters and passes through the outlet opening 95 of barrel muzzle housing member 91. Such outlet 95 has a reduced diameter with respect to the diameter of first mixing chamber 96 and, as is believed evident from the foregoing description, such reduction in size serves to increase the flow rate of the admixed air 62 and foam-forming material 84 as it leaves first mixing chamber 96. Barrel muzzle housing member 91 has a third opening means 102 formed through outlet 95 which serves to define a portion of the third material delivery means 22 and is suitably formed to be in direct communication with outlet opening 95.

With continued reference to FIG. 1, the third material delivery means 22 of the present invention also includes a second nozzle means 104, a nozzle adaptor 106, an elbow joint 108, a threaded fluid connector device 110 and a supply line 112. The second nozzle insert means 104 functions in essentially the same manner as the first nozzle means 28. Accordingly, a detailed description of its structure and function will hereinafter be dispensed with. However, it should, of course, be pointed out that the nozzle means 104 does include a nozzle housing member and an improved insert member as previously described. In the particular embodiment illustrated the nozzle means 104 is generally axially centered within outlet 95 for purposes to be discussed in the succeeding description of the instant invention. Such nozzle means 104, however, instead of being threadedly fastened to tubular body 30 cooperates with the tubular and internally threaded nozzle adaptor 106. The adaptor member 106 also has a portion thereof detachably secured to a threaded section of standard type elbow joint 108. The opposite end of elbow joint 108 is fastened in any known manner such as by threads, to one end of a conventional connector device 110. Connector device 116 threadedly cooperates with the aforenoted third opening means 102 formed through barrel muzzle housing member 91. Such connector device 110 functions to enable the flow of the resinous material 110 to travel into and through the elbow joint 108. The connector device 110 is appropriately secured to supply line 112 which in this particular instance is adapted to deliver any of a variety of curable synthetic resinous materials, such as, for example, urea formaldehyde, phenol urea formaldehyde, urea melamine formaldehyde, urea furfural formaldehyde. Although a synthetic curable resinous material 100 is presently being described as being associated with the improved foam-gun 10 of the present invention, it is certainly within the spirit and scope thereof that other suitable materials which are desired to be mixed may be suitably substituted. As depicted in the drawings, the elbow joint 108 and nozzle adaptor 106 are arranged such that they substantially center the second nozzle means 104 in outlet 95. The particular significance of this centered position will be described presently.

With particular reference to the third assembly means 24, it is essentially disclosed as being defined by a generally hollow elongated housing member 114 which has internally threaded inlet and outlet openings 116 and 118, respectively. Inlet opening 116 threadedly cooperates with the external threads formed on the outlet 95 of barrel muzzle housing member 91. Third assembly means 24 further defines a second mixing chamber 120 defining a mixing zone which has a diameter somewhat larger than that defined by either the inlet or outlet openings 116 and 118 of barrel muzzle housing member 91. In this manner, the foam-forming agent 84 which has been expanded by air 62 may travel freely through the outlet opening 95 and into the second chamber 120 at a much slower rate. Consequently, the materials have a relatively greater time to thoroughly mix. The resinous material 100 ejected from the second nozzle means 104, in a solid atomized manner, is discharged within the center of the flowing mixture stream of foam-forming material 89. It should be pointed out that the admixture stream 89 is formed in a generally annular stream. The annular configuration results from the fact that stream 89 passes through the radial clearance 122 defined between nozzle adaptor 106, elbow joint 108, and outlet opening 95. The particular significance of having the second nozzle means 104 centrally located with respect to the mixture stream 89 passing through the outlet 95 is that the resinous material 100 is discharged in a solid atomized spray into the center or core of the annular mixture stream 89. By this arrangement, the resinous material 100 will be more intimately and homogeneously mixed with stream 89 to form a foam material 11 which may be used for well-known purposes. In addition, the general direction of flow of the solid atomized resinous material 100 is substantially parallel to the direction of flow of the mixture stream 89. As a result thereof, the deleterious clogging effects which have been prevalent in the prior art foam-guns which handle simlar materials is virtually eliminated. As noted from FIG. 1, the resinuos material 100 and admixture stream 89 are homogeneously admixed within the second mixing chamber 120. By reason of the chamber 120 having a relatively larger diameter than outlet opening 95, as above indicated, the overall velocity of the flowing materials is reduced. Accordingly, this factor also contributes to a relatively more pronounced mixing action. The outlet opening 119, in a conventional manner, may be detachably secured to a standard foam application nozzle 124 which serves to apply the resulting foam material 11 onto the surface intended to be covered thereby. It should be pointed out that opening 118 has an internal diameter which is substantially less than that of the second mixing chamber 120. This is for purposes of increasing the discharge velocity of the foam stream as it exits from foam-gun 10.

Having thus described a preferred embodiment of a foam-gun apparatus 10 of the present invention, its mode of operation is believed evident from the foregoing description. However, to supplement such disclosure the foam-gun is operable to basically continuously produce foam material 11 in a manner which essentially comprises the steps of introducing a generally annular layered stream of a first material into a first chamber, introducing a solid atomized stream of a second material flowing in a generally parallel direction to the first stream into the interior of the first annular stream for homogeneously mixing both the first and second materials in the first chamber, forming the admixed stream of first and second materials into a generally annular layered stream which flows in a generally parallel direction to the direction of the admixed first and second stream, introducing the admixed annular stream into a second chamber, and introducing a solid atomized stream of a third material into the generally annular admixed stream, such that it flows in a generally parallel direction to such admixed stream for homogeneously mixing the third material with the admixed first and second materials formed in the annular stream.

From the foregoing described constructional organization of components forming the novel and improved foam-gun 10 of the present invention it at once becomes apparent that all three of the materials which are to be mixed together are introduced into the foam-gun so as they travel in a generally parallel direction. Moreover, the aforedescribed foam-gun 10 selectively increases and reduces the relative rate of materials traveling through the foam-gun so as to correspondingly provide for correspondingly varied mixing times. In addition, with this construction, it will be appreciated that the foam-gun 10 may be easily assembled and disassembled. This ease of assembling or disassembling enables a user thereof to more efficiently clean the foam-gun 10, as well as enable the substitution and/or removal of suitable nozzle insert members. Thus, a much more versatile spray gun is enabled to be manufactured and used in the field.

Additionally, the improved nozzle insert members 68 utilized in the foam-gun enable the formation of a solid atomized spray which in this particular instance serves to significantly enhance the mixing action of the materials so as to provide for an intimate and homogeneous admixture.

In addition, the present invention envisions that any suitable material may be used in the fabrication of the foam-gun. One such material which has been found to be successful in use with the materials mentioned above is aluminum. It has been determined that aluminum or a suitable aluminum alloy can be appropriately selected for use in the gun. Such aluminum or alloy would be selected to adequately withstand the adverse effects of the materials used in the gun. It should be pointed out, however, that although aluminum may be utilized, other suitable materials may likewise be used without departing from the spirit and scope of the invention.

While the invention has been described in connection with a preferred embodiment, it is not intended to limit the invention to the particular form set forth, but, on the contrary, it is intended to cover such alternatives, modifications, and equivalents as may be included within the spirit and scope of the invention as defined by the claims appended hereto.

What is claimed is:

1. An apparatus for homogeneously mixing materials comprising a first material delivery and mixing means having a feed opening, a first mixing chamber having a generally central axis, first outlet means, and first nozzle means, said first nozzle means for delivering a stream of finely atomized spray of a first material in said feed opening in directions generally parallel and transverse to the central axis of said chamber, and said first delivery and mixing means for delivering into said feed opening a generally annular stream of a second material about the spray of the first material such that both the first and second materials flow in substantially the same general direction, wherein the first stream mixes in the core of the layer of the second material to enable intimate and homogeneous mixing of the first and second materials, said first chamber being dimensioned larger than said feed opening to reduce the flow rate of the first and second materials passing therethrough, and said outlet means positioned downstream of said first chamber and being dimensioned smaller than said first chamber to increase the flow rate of the admixed material exiting said first chamber; and second material delivery and mixing means including third assembly means having a second mixing chamber and third material delivery means with a second nozzle means being operatively connected downstream to said first chamber, said third assembly and delivery means forming the homogeneous admixture of the first and second materials into a generally annular stream which flows in substantially the same general direction with respect to the mixing chamber as the first and second materials, said second nozzle means for introducing a finely atomized spray of a third material into the approximate center of the annular layered admixed stream such that the third material also flows in directions generally parallel and transverse to the annular stream of admixed first and second materials, thereby enabling the homogeneous admixture of the first, second and third materials in said second chamber, said second chamber being dimensioned larger than said outlet means to reduce the flow rates of the admixed stream and third material passing therethrough, means associated with said third assembly means to discharge the resultant admixture in substantially the same general direction as the first, second and third materials.

2. An apparatus as set forth in claim 1 in which said first material delivery and mixing means comprises a first assembly means which includes a first opening means and said first nozzle means being detachably connected to said first opening means for delivering a solid atomized spray of the first material centrally into said feed opening and including a second opening means formed adjacent and generally outwardly radially spaced from said first nozzle means to direct the second material to said feed opening for enabling the second material to be introduced into the feed opening, whereby the second material forms the generally annular stream about said first nozzle means.

3. An apparatus as set forth in claim 1 in which said first and second material delivery and mixing means are detachably connected together.

4. An apparatus as set forth in claim 3 in which said second mixing chamber is detachably connected together with and downstream of said first mixing chamber; and said third material delivery means which is generally centrally supported within said third assembly means for enabling the formation of the generally annular admixed stream of first and second materials, wherein said second chamber enables an intimate and homogeneous intermixing of the first, second and third materials.

5. An apparatus as set forth in claim 1 in which each of said first and second nozzle means includes a hollow nozzle housing member having centrally connected therein a nozzle insert member, said nozzle insert member having a generally elongated body portion with a nozzle head formed adjacent one end portion thereof, and a plurality of enlarged and inclined substantially V-shaped slots formed on said head portion for enabling a solid atomizing effect to be produced.

6. An apparatus as set forth in claim 5 in which said apparatus is fabricated from aluminum.

7. A foam-gun apparatus adapted for use in the continuous formation of a foam material comprising a first assembly means having a generally central axis and first and feed opening means formed therein; first material delivery means including a first nozzle means detachably cooperating with said first opening means positioned in said first assembly means for delivering a solid atomized spray of foam-forming material centrally within the feed opening means; a second material delivery means defined by at least said second opening means formed in said first assembly means adjacent and generally outwardly radially spaced from said first nozzle means for enabling air to be introduced into said feed opening means in such a manner that the air travels in a generally axial direction and forms a generally outer annular layer about the foam-forming material being delivered, whereby the foam-forming material is sprayed centrally within the annular stream of air, wherein the foam-forming material travels in directions generally parallel and transverse to the annular stream of air; second assembly means including third opening means which is operatively connected to said first assembly means downstream of said feed opening means such that a first mixing chamber is formed and located downstream of said first and feed opening means, said first chamber having a larger cross-sectional area than said feed opening means for slowing down the rate of air and foam-forming solution for enabling an intimate and homogeneous admixing of the flowing streams of air and foam-forming solution, said second assembly means includes frothing means for including frothing in said first mixing chamber, a third assembly means operatively connected to and downstream of said second assembly means and having an inlet opening; and third material delivery means including a second spray nozzle means connected to said third assembly means and generally centrally positioned with respect to said inlet opening means for enabling the formation of a second generally annular stream of admixed air and foam-forming materials and for enabling a resinous material to be sprayed into the center of the admixture in an atomized solid spray such that it travels in directions generally parallel and transverse to the admixed stream for intimately and homogeneously mixing the admixed air and foam-forming material with the resinous material, said third assembly means forming a second mixing chamber wherein mixing of the admixed air and foam-forming material occurs with the resinous material prior to exiting from said gun, said second chamber having a diameter larger than said inlet opening for reducing the flow rate of material passing therethrough, and said inlet opening having a lesser cross-sectional dimension than said first and second chambers for increasing the flow rate from said first and second chambers.

8. A foam-gun as set forth in claim 7 in which said frothing means is comprised of a mesh material.

9. A foam-gun as set forth in claim 8 in which said mesh material is comprised of stainless steel.

10. A foam-gun as set forth in claim 8 in which said mesh material is comprised of plastic.

11. A foam-gun as set forth in claim 8 in which said mesh material weighs between from about 2 to 10 grams whenever the diameter of said first chamber is about $1\frac{3}{8}$ inches.

12. A process for manufacturing a foam material or the like comprising the steps of (a) introducing into a first mixing zone a generally annular stream of a first gaseous material;

(b) introducing into the central portion of said first annular stream an atomized stream of a foam-forming material such that the foam-forming material flows in directions generally parallel and transverse to said first annular stream thereby causing substantially uniform and homogeneous intermixing of said materials;

(c) forming said admixed stream of first and second materials into a second generally annular stream;

(d) directing said generally annular stream into a second mixing zone while simultaneously reducing the speed of said first and second materials;

(e) introducing into the central portion of said annular admixed stream an atomized stream of a curable synthetic resinous material in directions generally parallel and transverse to said second annular admixed stream thereby causing said curable synthetic resinous material to become intermixed substantially uniformly with said annular admixed stream to form a substantially homogeneous synthetic resinous foam material; and (f) directing said synthetic resinous foam material away from said second mixing zone.

13. A process as set forth in claim 12, which further comprises the step of reducing the speed of the flow of first and foam-forming material entering the first mixing zone for enabling a greater duration for such mixing to occur.

14. A process as set forth in claim 12, which further comprises the step of directing the flow of first and foam-forming material through frothing means in said first mixing zone.

15. A process for manufacturing a foam material comprising the steps of:

(a) introducing into a first mixing zone a generally annular stream of a first gaseous material;

(b) introducing into the central portion of said first annular stream an atomized stream of a foam-forming material such that the foam-forming material flows in directions generally parallel and transverse to said first annular stream while directing said gaseous material and foam-forming material through frothing means thereby causing substantially uniform and homogeneous intermixing and frothing of said materials;

(c) forming said admixed stream of first and second materials into a second generally annular stream while directing said annular stream into a zone having a relatively restricted cross-sectional area;

(d) directing said second annular stream into a second mixing zone having a relatively greater cross-sectional area thereby permitting said annular stream materials to expand;

(e) introducing into the central portion of said annular admixed stream, an atomized stream of a curable synthetic resinous material such that the material flows in directions generally parallel and transverse to said second annular admixed stream thereby causing said curable synthetic resinous material to become intermixed substantially uniformly with said annular admixed stream to form a substantially homogeneous synthetic resinous foam material; and directing said synthetic resinous foam material away from said second mixing zone.

16. A process according to claim 15, which further comprises the step of inducing frothing of said air and foam-forming material in said first mixing zone by directing said air and foam-forming material through multiple tortuous paths.

17. A process according to claim 16, which further comprises the step of inducing frothing of said air and foam-forming material in said first mixing zone by directing said air and foam-forming material through frothing means in the form of a frothing mesh positioned within said first mixing zone.

18. A process as set forth in claim 17, which further comprises directing said first admixed stream of air and foam-forming material through at least one mesh screen in said first mixing zone to thereby create generally uniformly reduced foam-forming cells.

19. A process according to claim 18, which further comprises the step of increasing the speed of the materials directed away from the second mixing zone.

20. A process acording to claim 19, which further comprises the step of inducing frothing of said air and foam-forming material in said first mixing zone by directing said air and foam-forming material through a stainless steel frothing mesh positioned within said first mixing zone.

21. A process as set forth in claim 20 in which said step of inducing a frothing action includes varying the cell size of the material by inversely varying the volume of frothing mesh.

22. A process for manufacturing a foam material comprising the steps of:

(a) introducing into a first mixing zone a generally annular stream of air;

(b) introducing into the central portion of said first annular stream of air, a substantially, solid, generally conical atomized stream of foam-forming catalyst containing material such that the foam-forming flows in directions generally parallel and transverse to said first annular stream of air while directing said air and foam-forming catalyst through a frothing mesh and at least one screen positioned within said first mixing zone to thereby cause substantially uniform and homogeneous intermixing and frothing of said air and foam-forming catalyst;

(c) forming said admixed stream of air and foam-forming catalyst containing material into a second generally annular stream while simultaneously increasing the speed thereof;

(d) directing said second generally annular stream of materials into a second mixing zone while permitting said materials to expand thereby reducing the speed of the materials;

(e) introducing into the central portion of said second annular admixed stream a substantially solid, generally conical stream of curable synthetic resinous material such that the resinous material flows in directions generally parallel and transverse to said second annular admixed stream to thereby form a substantially homogeneous synthetic resinous foam material; and (f) introducing said admixed stream of synthetic resinous foam material into a conduit having a cross-sectional area less than the cross-sectional area of said second mixing zone thereby increasing the speed of the foam material while directing said synthetic resinous foam material away from said second mixing zone.

23. A process for manufacturing a foam material or the like comprising the steps of
(a) introducing into a first mixing zone a generally annular stream of a first gaseous material;
(b) introducing into the central portion of said first annular stream an atomized stream of a foam-forming material such that the foam-forming material flows in directions generally parallel and transverse to said first annular stream thereby causing substantially uniform and homogeneous intermixing of said materials;
(c) forming said admixed stream of first and second materials into a second generally annular stream while directing said first and second materials into a zone of relatively restricted cross-sectional area;
(d) directing said second annular stream into a second mixing zone, at least a portion of which has a relatively greater cross-sectional area;
(e) introducing into the central portion of said annular admixed stream an atomized stream of a curable synthetic resinous material in directions generally parallel and transverse to said second annular admixed stream thereby causing said curable synthetic resinous material to become intermixed substantially uniformly with said annular admixed stream to form a substantially homogeneous synthetic resinous foam material; and
(f) directing said synthetic resinous foam material away from said second mixing zone.

* * * * *

UNITED STATES PATENT AND TRADEMARK OFFICE
CERTIFICATE OF CORRECTION

PATENT NO. : 4,103,876
DATED : August 1, 1978
INVENTOR(S) : Walter J. Hasselman, Jr.; Walter J. Hasselman, Sr.

It is certified that error appears in the above-identified patent and that said Letters Patent are hereby corrected as shown below:

Column 8, line 56, "defines a generally" should read --defines a first mixing zone generally--.

Column 11, line 13, "of barrel muzzle housing member 91." should read --of housing member 114.--.

Column 15, line 67, "directing" should read --(f) directing--.

Column 16, line 20, "acording" should read --according--.

Column 16, line 37, "foam-forming flows" should read --foam-forming catalyst containing material flows--.

Column 16, line 42, "catalyst through" should read --catalyst containing material through--.

Column 16, line 45, "catalyst;" should read --catalyst containing material;--.

Signed and Sealed this

Twenty-fifth Day of September 1979

[SEAL]

Attest:

LUTRELLE F. PARKER

Attesting Officer    Acting Commissioner of Patents and Trademarks